(12) United States Patent
Lowrey et al.

(10) Patent No.: US 7,747,365 B1
(45) Date of Patent: Jun. 29, 2010

(54) INTERNET-BASED SYSTEM FOR MONITORING VEHICLES

(75) Inventors: Larkin Hill Lowrey, La Jolla, CA (US);
Matthew J. Banet, Del Mar, CA (US);
Bruce Lightner, La Jolla, CA (US);
Diego Borrego, San Diego, CA (US);
Chuck Myers, La Jolla, CA (US)

(73) Assignee: HTIIP, LLC, Atlanta, GA (US)

( * ) Notice: Subject to any disclaimer, the term of this patent is extended or adjusted under 35 U.S.C. 154(b) by 0 days.

(21) Appl. No.: 10/614,665

(22) Filed: Jul. 7, 2003

Related U.S. Application Data

(63) Continuation of application No. 09/804,888, filed on Mar. 13, 2001, now abandoned.

(51) Int. Cl.
*G01M 17/00* (2006.01)
(52) U.S. Cl. .......................................... 701/29; 340/989
(58) Field of Classification Search ............. 701/29–31, 701/32, 33, 35, 3, 2; 340/989–993, 439
See application file for complete search history.

(56) References Cited

U.S. PATENT DOCUMENTS

| | | | |
|---|---|---|---|
| 3,748,894 A | 7/1973 | White et al. | |
| 4,258,421 A | 3/1981 | Juhasz et al. | |
| 4,602,127 A | 7/1986 | Neely et al. | |
| 4,690,475 A | 9/1987 | McElroy | |
| 4,694,408 A | 9/1987 | Zaleski | |
| 4,926,330 A | 5/1990 | Abe et al. | |
| 4,956,777 A | 9/1990 | Cearley et al. | |
| 5,003,317 A | 3/1991 | Gray et al. | |
| 5,026,293 A | 6/1991 | Wilson | |
| 5,050,080 A | 9/1991 | Abe | |
| 5,157,610 A | 10/1992 | Asano et al. | |
| 5,223,844 A | 6/1993 | Mansell et al. | |
| 5,289,378 A | 2/1994 | Miller et al. | |
| 5,343,906 A | 9/1994 | Tibbals, III | |
| 5,442,553 A | 8/1995 | Parrillo | |
| 5,450,321 A | 9/1995 | Crane | |
| 5,463,567 A | 10/1995 | Boen et al. | |

(Continued)

FOREIGN PATENT DOCUMENTS

CA 2133673 10/1994

(Continued)

OTHER PUBLICATIONS

Bary W. Wilson et al., Modular system for multiparameter in-line machine fluid analysis (Technology showcase Apr. 3-6, 2000).

(Continued)

*Primary Examiner*—Dalena Tran
(74) *Attorney, Agent, or Firm*—John L. Doughty

(57) ABSTRACT

The invention provides a method for monitoring a vehicle that features the steps of: 1) generating a data packet including vehicle data retrieved from the vehicle using a wireless appliance; 2) transmitting the data packet over an airlink with the wireless appliance so that the data packet passes through a network and to a host computer system; 3) processing the data packet with the host computer system to generate a set of data; and 4) displaying the set of data on a web page hosted on the internet.

65 Claims, 7 Drawing Sheets

U.S. PATENT DOCUMENTS

| | | | |
|---|---|---|---|
| 5,473,540 A | 12/1995 | Schmitz | |
| 5,479,479 A | 12/1995 | Braitberg et al. | |
| 5,491,486 A | 2/1996 | Welles et al. | |
| 5,519,621 A | 5/1996 | Wortham | |
| 5,532,927 A | 7/1996 | Pink et al. | |
| 5,537,336 A | 7/1996 | Joyce | |
| 5,550,551 A | 8/1996 | Alesio | |
| 5,555,498 A | 9/1996 | Berra et al. | |
| 5,574,427 A | 11/1996 | Cavallaro | |
| 5,586,130 A | 12/1996 | Doyle | |
| 5,619,412 A | 4/1997 | Hapka | |
| 5,633,645 A | 5/1997 | Day | |
| 5,636,122 A | 6/1997 | Shah et al. | |
| 5,671,141 A | 9/1997 | Smith et al. | |
| 5,673,305 A | 9/1997 | Ross | |
| 5,680,328 A | 10/1997 | Skorupski et al. | |
| 5,732,074 A | 3/1998 | Spaur et al. | |
| 5,737,215 A | 4/1998 | Schricker et al. | |
| 5,739,761 A | 4/1998 | Kobayashi | |
| 5,750,886 A | 5/1998 | Lambert et al. | |
| 5,754,965 A | 5/1998 | Hagenbuch | |
| 5,758,300 A | 5/1998 | Abe | |
| 5,774,828 A | 6/1998 | Brunts et al. | |
| 5,781,101 A | 7/1998 | Stephen et al. | |
| 5,781,871 A | 7/1998 | Mezger et al. | |
| 5,797,134 A | 8/1998 | McMillan et al. | |
| 5,798,647 A | 8/1998 | Martin et al. | |
| 5,808,907 A | 9/1998 | Shetty et al. | |
| 5,815,071 A | 9/1998 | Doyle | |
| 5,828,585 A | 10/1998 | Welk et al. | |
| 5,844,473 A | 12/1998 | Kaman | |
| 5,850,209 A | 12/1998 | Lemke et al. | |
| 5,884,202 A | 3/1999 | Arjornand | |
| 5,928,292 A | 7/1999 | Miller et al. | |
| 5,941,918 A | 8/1999 | Blosser | |
| 5,964,821 A | 10/1999 | Brunts et al. | |
| 5,987,377 A | 11/1999 | Westerlage et al. | |
| 6,020,654 A | 2/2000 | Chutorash | |
| 6,064,970 A | 5/2000 | McMillan et al. | |
| 6,088,648 A | 7/2000 | Shah et al. | |
| 6,104,988 A | 8/2000 | Klarer | |
| 6,140,969 A | 10/2000 | Lindenmeier et al. | |
| 6,141,611 A | 10/2000 | Mackey et al. | |
| 6,141,710 A | 10/2000 | Miesterfeld | |
| 6,144,916 A | 11/2000 | Wood, Jr. et al. | |
| 6,154,658 A | 11/2000 | Caci | |
| 6,167,426 A | 12/2000 | Payne et al. | |
| 6,202,008 B1 | 3/2001 | Beckert et al. | |
| 6,208,948 B1 | 3/2001 | Klingler et al. | |
| 6,225,898 B1 | 5/2001 | Kamiya et al. | |
| 6,236,933 B1 | 5/2001 | Lang | |
| 6,240,295 B1 | 5/2001 | Kennedy et al. | |
| 6,240,365 B1 | 5/2001 | Bunn | |
| 6,246,935 B1 | 6/2001 | Buckley | |
| 6,263,268 B1 | 7/2001 | Nathanson | |
| 6,278,921 B1 | 8/2001 | Harrison et al. | |
| 6,285,953 B1 | 9/2001 | Harrison et al. | |
| 6,295,492 B1 | 9/2001 | Lang et al. | |
| 6,330,499 B1 * | 12/2001 | Chou et al. | 701/33 |
| 6,338,152 B1 | 1/2002 | Fera et al. | |
| 6,339,736 B1 | 1/2002 | Moskowitz et al. | |
| 6,339,745 B1 | 1/2002 | Novik | |
| 6,346,876 B1 | 2/2002 | Flick | |
| 6,354,868 B1 | 3/2002 | Korczynski et al. | |
| 6,356,205 B1 | 3/2002 | Salvo et al. | |
| 6,356,823 B1 | 3/2002 | Iannotti et al. | |
| 6,400,701 B2 * | 6/2002 | Lin et al. | 370/336 |
| 6,405,106 B1 | 6/2002 | Sheth et al. | |
| 6,408,232 B1 | 6/2002 | Cannon et al. | |
| 6,429,773 B1 | 8/2002 | Schuyler | |
| 6,442,460 B1 | 8/2002 | Larson et al. | |
| 6,459,988 B1 | 10/2002 | Fan et al. | |
| 6,480,170 B1 | 11/2002 | Langley et al. | |
| 6,487,479 B1 | 11/2002 | Nelson | |
| 6,487,494 B2 | 11/2002 | Odinak et al. | |
| 6,487,717 B1 | 11/2002 | Brunemann et al. | |
| 6,496,777 B2 * | 12/2002 | Tennison et al. | 701/213 |
| 6,502,030 B2 * | 12/2002 | Hilleary | 701/207 |
| 6,505,106 B1 * | 1/2003 | Lawrence et al. | 701/35 |
| 6,507,786 B2 | 1/2003 | Flick | |
| 6,522,267 B2 * | 2/2003 | Flick | 340/989 |
| 6,526,335 B1 | 2/2003 | Treyz et al. | |
| 6,526,460 B1 | 2/2003 | Dauner et al. | |
| 6,529,159 B1 | 3/2003 | Fan et al. | |
| 6,552,682 B1 | 4/2003 | Fan et al. | |
| 6,556,889 B2 * | 4/2003 | Rudick et al. | 700/244 |
| 6,556,905 B1 * | 4/2003 | Mittelsteadt et al. | 701/35 |
| 6,564,127 B1 * | 5/2003 | Bauerle et al. | 701/33 |
| 6,580,916 B1 | 6/2003 | Weisshaar et al. | |
| 6,594,579 B1 | 7/2003 | Lowrey et al. | |
| 6,604,032 B1 | 8/2003 | Moller | |
| 6,604,033 B1 * | 8/2003 | Banet et al. | 701/33 |
| 6,604,038 B1 | 8/2003 | Lesesky et al. | |
| 6,609,051 B2 | 8/2003 | Fiechter et al. | |
| 6,611,686 B1 * | 8/2003 | Smith et al. | 340/989 |
| 6,611,739 B1 * | 8/2003 | Harvey et al. | 701/29 |
| 6,611,740 B2 | 8/2003 | Lowrey et al. | |
| 6,611,755 B1 * | 8/2003 | Coffee et al. | 701/213 |
| 6,636,790 B1 * | 10/2003 | Lightner et al. | 701/33 |
| 6,675,081 B2 | 1/2004 | Shuman et al. | |
| 6,678,614 B2 | 1/2004 | McCarthy et al. | |
| 6,687,587 B2 | 2/2004 | Kacel | |
| 6,694,234 B2 | 2/2004 | Lockwood et al. | |
| 6,718,425 B1 | 4/2004 | Pajakowski et al. | |
| 6,732,031 B1 | 5/2004 | Lightner et al. | |
| 6,732,032 B1 | 5/2004 | Banet et al. | |
| 6,751,452 B1 | 6/2004 | Kupczyk et al. | |
| 6,751,479 B1 | 6/2004 | Knight | |
| 6,754,485 B1 | 6/2004 | Obradovich et al. | |
| 6,757,262 B1 | 6/2004 | Weisshaar et al. | |
| 6,845,362 B2 | 1/2005 | Furuta et al. | |
| 6,895,444 B1 | 5/2005 | Weisshaar et al. | |
| 6,944,121 B1 | 9/2005 | Weste et al. | |
| 6,947,760 B2 | 9/2005 | Weisshaar et al. | |
| 6,947,816 B2 | 9/2005 | Chen | |
| 6,973,324 B2 | 12/2005 | Weisshaar et al. | |
| 7,092,803 B2 | 8/2006 | Kapolka et al. | |
| 7,155,321 B2 | 12/2006 | Bromley et al. | |
| 2001/0016789 A1 | 8/2001 | Staiger | |
| 2001/0018628 A1 | 8/2001 | Jenkins et al. | |
| 2001/0033225 A1 * | 10/2001 | Razavi et al. | 340/425.5 |
| 2001/0034609 A1 * | 10/2001 | Dovolis | 705/1 |
| 2002/0008644 A1 * | 1/2002 | Flick | 340/988 |
| 2002/0008645 A1 * | 1/2002 | Flick et al. | 340/988 |
| 2002/0016655 A1 * | 2/2002 | Joao | 701/35 |
| 2002/0029101 A1 | 3/2002 | Larson et al. | |
| 2002/0032505 A1 * | 3/2002 | Good | 701/29 |
| 2002/0065698 A1 * | 5/2002 | Schick et al. | 705/8 |
| 2002/0073170 A1 * | 6/2002 | Hoffman et al. | 709/217 |
| 2002/0078458 A1 | 6/2002 | Furon et al. | |
| 2002/0099520 A1 * | 7/2002 | Falada et al. | 702/182 |
| 2002/0118222 A1 * | 8/2002 | Fogarty | 345/741 |
| 2002/0133273 A1 | 9/2002 | Lowrey et al. | |
| 2002/0140545 A1 | 10/2002 | Nietupski et al. | |
| 2002/0143446 A1 * | 10/2002 | Rogers et al. | 701/33 |
| 2002/0147610 A1 * | 10/2002 | Tabe | 705/1 |
| 2002/0150050 A1 | 10/2002 | Nathanson | |
| 2002/0171650 A1 * | 11/2002 | Prabhakaran | 345/530 |
| 2002/0173889 A1 | 11/2002 | Odinak et al. | |
| 2002/0177476 A1 | 11/2002 | Chou | |
| 2003/0004623 A1 | 1/2003 | Namaky et al. | |
| 2003/0004624 A1 | 1/2003 | Wilson et al. | |
| 2003/0009270 A1 | 1/2003 | Breed | |
| 2003/0078722 A1 | 4/2003 | Odinak et al. | |

| | | | |
|---|---|---|---|
| 2003/0083809 A1 | 5/2003 | Hatano | |
| 2003/0093199 A1 | 5/2003 | Mavreas | |
| 2003/0093204 A1* | 5/2003 | Adachi et al. | 701/50 |
| 2003/0130005 A1 | 7/2003 | Weisshaar et al. | |
| 2003/0139179 A1 | 7/2003 | Fuchs et al. | |
| 2003/0147534 A1 | 8/2003 | Ablay et al. | |
| 2003/0182055 A1 | 9/2003 | Curatolo et al. | |
| 2003/0231118 A1 | 12/2003 | Kitson | |
| 2003/0236596 A1 | 12/2003 | Eisenmann et al. | |
| 2004/0023645 A1 | 2/2004 | Olsen et al. | |
| 2004/0039502 A1 | 2/2004 | Wilson et al. | |
| 2004/0039504 A1* | 2/2004 | Coffee et al. | 701/35 |
| 2004/0044454 A1 | 3/2004 | Ross et al. | |
| 2004/0075539 A1 | 4/2004 | Savoie et al. | |
| 2004/0093134 A1* | 5/2004 | Barber et al. | 701/29 |
| 2004/0104842 A1 | 6/2004 | Drury et al. | |
| 2004/0196182 A1 | 10/2004 | Unnold | |
| 2005/0131729 A1* | 6/2005 | Melby et al. | 705/1 |
| 2007/0069947 A1 | 3/2007 | Banet et al. | |

FOREIGN PATENT DOCUMENTS

| | | |
|---|---|---|
| CA | 2372900 A1 | 5/2003 |
| EP | 0816820 A2 | 1/1998 |
| WO | WO 00/40038 | 7/2000 |
| WO | WO 00/79727 | 12/2000 |

OTHER PUBLICATIONS

U.S. Appl. No. 09/776,083, filed Feb. 1, 2001, Banet et al.
U.S. Appl. No. 09/776,106, filed Feb. 1, 2001, Lightner et al.
U.S. Appl. No. 09/804,888, filed Mar. 13, 2001, Lowrey et al.
U.S. Appl. No. 09/908,440, filed Jul. 18, 2001, Lightner et al.
U.S. Appl. No. 10/301,010, filed Nov. 21, 2002, Lightner et al.
U.S. Appl. No. 10/431,947, filed May 8, 2003, Hunt et al.
U.S. Appl. No. 10/447,713, filed May 29, 2003, Lightner et al.
U.S. Appl. No. 10/456,246, filed Jun. 6, 2003, Lowrey et al.
U.S. Appl. No. 10/456,788, filed Jun. 6, 2003, Banet et al.
U.S. Appl. No. 10/615,516, filed Jul. 8, 2003, Lightner et al.
U.S. Appl. No. 10/625,942, filed Jul. 24, 2003, Banet et al.
U.S. Appl. No. 10/626,779, filed Jul. 24, 2003, Lightner et al.
U.S. Appl. No. 10/626,810, filed Jul. 24, 2003, Lowrey et al.
U.S. Appl. No. 10/632,033, filed Jul. 31, 2003, Banet et al.
U.S. Appl. No. 10/810,373, filed Mar. 26, 2004, Lowrey et al.
U.S. Appl. No. 10/823,478, filed Apr. 13, 2004, Williams et al.
U.S. Appl. No. 10/831,952, filed Apr. 26, 2004, Hunt et al.
U.S. Appl. No. 10/841,724, filed May 7, 2004, Lightner et al.
U.S. Appl. No. 10/440,596, filed May 19, 2003, Lang et al.
Definition of "Chipset", Wikipedia. http://en.wikipedia.org/wiki/Chipset. Feb. 23, 2006.
40 CFR 51, Ch. I (Jul. 1, 2001 Edition), pp. 130-481.
40 CFR 85, Ch. I (Jul. 1, 2001 Edition), 143 pages.
Motorola, Inc., "Automotive ISO 9141 Serial Link Driver," Document MC333199/D, 1996, 12 pages.
D. John Oliver, Intel Corporation, "Implementing the J 1850 Protocol," 15 pages.
"I$^2$C," printed from http://www.nxp.com, Internet site, (associated with www.philipslogic.com), website accessed on Jun. 8, 2006, 3 pages.
"Qualcomm Chipset Solutions," printed from http://www.qualcomm.com, Internet site, website accessed on Jun. 8, 2006, 48 pages.
U.S. Appl. No. 11/654,213, filed Jan. 17, 2007.
U.S. Appl. No. 11/784,053, filed Apr. 5, 2007.
U.S. Appl. No. 11/788,930, filed Apr. 23, 2007.
U.S. Appl. No. 11/796,372, filed Apr. 27, 2007.
U.S. Appl. No. 11/799,848, filed May 3, 2007.
U.S. Appl. No. 11/948,473 and Preliminary Amendment, filed Nov. 30, 2007.
U.S. Appl. No. 11/948,489 and Preliminary Amendment, filed Nov. 30, 2007.
U.S. Appl. No. 11/948,496 and Preliminary Amendment, filed Nov. 30, 2007.
U.S. Appl. No. 11/948,515 and Preliminary Amendment, filed Nov. 30, 2007.
Notice of Disclosure by HTI IP, LLC of Asserted Claims and Infringement Contentions and Document Production Accompanying Disclosure.
1 Appendix Chart of Asserted Claims 6,636,790, 6:07-CV-00466-LED, entered Feb. 11, 2008.
2 Appendix Chart of Asserted Claims 6,372,031, 6:07-CV-00466-LED, entered Feb. 11, 2008.
3 Appendix Chart of Asserted Claims 6,611,740, 6:07-CV-00466-LED, entered Feb. 11, 2008.
Definition of "Chipset," printed from Webopedia, Internet site, Oct. 31, 2002, 3 pages.

* cited by examiner

Customer List

Search For All Customers and Found 24 record(s).

| Customer | Car (Year, Model) | VIN | Alerts |
|---|---|---|---|
| A,Shuttle | 2000 TOYOTA PREVIA | 4T3ZF13C1YU231434 | 0 |
| B,Shuttle | 2000 TOYOTA SIENNA | 4T3ZF19C51U354974 | 0 |
| Benson,Gary | 2000 TOYOTA TACOMA | 4TAWN72N5YZ625252 | 0 |
| Bilgrien,Rick | 2001 TOYOTA TUNDRA | 5TBRT34101S153441 | 0 |
| Bushnell,Bill | 2001 TOYOTA AVALON | 4T1BF28B51U115644 | 0 |
| Dangel,Dayton | 2001 TOYOTA TUNDRA | 5TBRT34151S146629 | 1 |
| Edwards,Barbara | 2000 TOYOTA CAMRY | JT2BG22K71U568044 | 0 |
| Five,Loaner | 2001 TOYOTA COROLLA | 1NXBR12EX1Z460589 | 0 |
| Gerard,Jerry | 2001 TOYOTA CAMRY | 4T1BG22K21U768728 | 1 |
| Greenlaw,Dana | 2000 TOYOTA TACOMA | 5TESN92N9YZ699955 | 0 |
| Grudek,Mandi | 2001 TOYOTA COROLLA | 1NXBR12E41Z473970 | 0 |
| Heyden,Lee | 2000 TOYOTA CAMRY | JT2BG22K4Y0464936 | 1 |
| Lizalde,Gus | 2001 TOYOTA CAMRY | JT2BG22K81O563788 | 0 |
| Mendelson,Ivan | 2001 TOYOTA CAMRY | JT2BG22KX10541288 | 1 |
| Novello,Leo | 2001 TOYOTA TUNDRA | 5TBRT34161S145439 | 1 |
| Pereira,Tony | 2001 TOYOTA CAMRY | JT2BG22KX10550217 | 0 |
| Prasad,Sharon | 2001 TOYOTA COROLLA | 1NXBR12E91Z474788 | 0 |
| Santana,Octavio | 2001 TOYOTA TACOMA | 5TEVL52N61Z741680 | 0 |
| Scofonas,Bob | 2001 TOYOTA 4RUNNER | JT3GN87R01O182856 | 0 |
| Schuler,Howard | 2000 TOYOTA SIENNA | 4T3ZF13C8YU259988 | 0 |
| Seven,Loaner | 2001 TOYOTA COROLLA | 1NXBR12E51Z460547 | 0 |
| Steagall,Jack | 2001 TOYOTA CAMRY | JT2BG22K81O533030 | 0 |
| Two,Loaner | 2001 TOYOTA COROLLA | 1NXBR12E41Z455761 | 0 |
| Weston,Dale | 2001 TOYOTA CAMRY | JT2BG22K9Y0426112 | 1 |

Fig. 3

INTERNET-BASED SYSTEM FOR MONITORING VEHICLES

This application is a continuation application of U.S. patent application Ser. No. 09/804,888, filed Mar. 13, 2001 now abandoned, the contents of which are incorporated herein by reference.

FIELD OF THE INVENTION

The present invention relates to use of an internet-based system for monitoring a vehicle's performance.

BACKGROUND OF THE INVENTION

The Environmental Protection Agency (EPA) requires vehicle manufacturers to install on-board diagnostics (OBD-II) for monitoring light-duty automobiles and trucks beginning with model year 1996. OBD-II systems (e.g., microcontrollers and sensors) monitor the vehicle's electrical and mechanical systems and generate data that are processed by a vehicle's engine control unit (ECU) to detect any malfunction or deterioration in the vehicle's performance. Most ECUs transmit status and diagnostic information over a shared, standardized electronic buss in the vehicle. The buss effectively functions as an on-board computer network with many processors, each of which transmits and receives data. The primary computers in this network are the vehicle's electronic-control module (ECM) and power-control module (PCM). The ECM typically monitors engine functions (e.g., the cruise-control module, spark controller, exhaust/gas recirculator), while the PCM monitors the vehicle's power train (e.g., its engine, transmission, and braking systems). Data available from the ECM and PCM include vehicle speed, fuel level, engine temperature, and intake manifold pressure. In addition, in response to input data, the ECU also generates 5-digit 'diagnostic trouble codes' (DTCs) that indicate a specific problem with the vehicle. The presence of a DTC in the memory of a vehicle's ECU typically results in illumination of the 'Service Engine Soon' light present the dashboard of most vehicles.

Data from the above-mentioned systems are made available through a standardized, serial 16-cavity connector referred to herein as an 'OBD-II connector'. The OBD-II connector typically lies underneath the vehicle's dashboard. When a vehicle is serviced, data from the standardized buss is typically queried using an external engine-diagnostic tool (commonly called a 'scan tool') that connects to the OBD-II connector. The data are then displayed an analyzed with the scan tool, and can then be used to service the vehicle.

Some vehicle manufacturers also include complex electronic systems in their vehicles to access and analyze some of the above-described data. For example, General Motors includes a system called 'On-Star' in some of their high-end vehicles. On-Star collects and transmits data relating to these DTCs through a wireless network. On-Star systems are not connected through the OBD-II connector, but instead are wired directly to the vehicle's electronic system. This wiring process typically takes place when the vehicle is manufactured.

BRIEF SUMMARY OF THE INVENTION

It is an object of the present invention to provide a wireless, internet-based system for monitoring a vehicle. Specifically, it is an object of the invention to access data from a vehicle, analyze it, and make it available to organizations (e.g. an automotive dealership or service center) over the internet so that the vehicle's performance can be analyzed accurately and in real-time. The data include, for example, DTCs that trigger 'alert messages' that are emailed to a vehicle owner or displayed on a web page on the internet.

In one aspect, the invention provides a method for monitoring a vehicle that features the steps of: 1) generating a data packet that includes data retrieved from the vehicle using a wireless appliance; 2) transmitting the data packet over an airlink with the wireless appliance so that it passes through a network and to a host computer system; 3) processing the data packet with the host computer system to generate a set of data; and 4) displaying the set of data on a web page hosted on the internet.

The 'wireless appliance' used in the above-described method includes electronics that extract data from the vehicle's ECU, and a transmitting component (e.g. a radio or cellular modem) that sends out the data packet over an existing network (e.g., Cingular's Mobitex network). Such a wireless appliance is described in the U.S. patent application Ser. No. 09/776,106, entitled WIRELESS DIAGNOSTIC SYSTEM FOR VEHICLES, and filed Feb. 1, 2001, the contents of which are incorporated herein by reference.

In embodiments, the processing step includes extracting at least one of the following vehicle parameters from the data packet: numerical data, an alphanumeric text message, an active or pending diagnostic trouble code (e.g., a 5-digit code), or a vehicle identification number. These parameters are then processed with database software (e.g., an Oracle database) to generate a set of data that comprises an alphanumeric, text message. The text message, e.g. an alert message, can be displayed on the web page or emailed to a user. The text message can also include a description of the data parameter, such as a written description of the DTC.

In related embodiments, the method includes the step of processing at least one numerical parameter from the numerical data with a mathematical algorithm. This generates an alert message from data other than DTCs. For example, the numerical parameter can be compared or displayed with at least one numerical parameter generated at an earlier point in time (e.g., a previously determined fuel level), or with a predetermined numerical value (e.g., a mileage level corresponding to a recommended service appointment). These values, or a simple analysis of the data, can be included in the alphanumeric text message displayed on the web page or sent out in an email.

In another aspect, the invention features a similar set of steps for processing data from multiple vehicles (e.g., a group of customers) associated with a corporate organization (e.g., a vehicle dealership). Specifically, the invention features the steps of 1) generating a first data packet comprising vehicle data retrieved from a first vehicle in a set of vehicles using a first wireless appliance disposed in the first vehicle; 2) transmitting the first data packet over an airlink with the first wireless appliance so that it passes through a network and to a host computer system; 3) repeating steps 1 and 2 for a second vehicle; 4) processing the first and second data packets with the host computer system to generate first and second sets of data; 5) displaying the first set of data on a first web page hosted on the Internet; and 6) displaying the first and second sets of data on a second web page hosted on the internet.

In this embodiment, a single web site includes the first and second web pages. The web site also includes a 'login' web page for entering a user name and a password so that one group of users (e.g. vehicle owners) can log in with and view data from a single vehicle, while another group (e.g. corporate organizations such as vehicle dealerships, vehicle-rental organizations, insurance organizations, or fleet organizations) can log in and view data of all the users associated with the group.

In the above-described method, the term "airlink" refers to a standard wireless connection (e.g., a connection used for wireless telephones or pagers) between a transmitter and a receiver. Also in the above-described method, the 'generating' and 'transmitting' steps can be performed at any time and with any frequency, depending on the diagnoses being performed. For a 'real-time' diagnoses of a vehicle's engine performance, for example, the steps may be performed at rapid time or mileage intervals (e.g., several times each minute, or every few miles). Alternatively, other diagnoses (e.g. an emissions or 'smog' check) may require the steps to be performed only once each year or after a large number of miles are driven. Alternatively, the vehicle may be configured to automatically perform these steps at predetermined or random time intervals.

The term 'web page' refers to a single page that is hosted on the Internet or world-wide web. A 'web site' typically includes multiple web pages.

The invention has many advantages. In particular, wireless transmission of data from a vehicle, followed by analysis and display of these data using a web site hosted on the internet, makes it possible to diagnose the performance of a vehicle in real-time from virtually any location that has internet access. This ultimately means the problems with the vehicle can be efficiently diagnosed, and in some cases predicted before they actually occur. Moreover, data from the vehicle can be queried and analyzed while the vehicle is actually in use to provide a relatively comprehensive diagnosis that is not possible using a conventional scan tool. An internet-based system for vehicle diagnoses can also be easily updated and made available to a large group of users simply by updating software on the web site. In contrast, a comparable updating process for a series of scan tools can only be accomplished by updating the software on each individual scan tool.

The wireless appliance used to access and transmit the vehicle's data is small, low-cost, and can be easily installed in nearly every vehicle with an OBD-II connector in a matter of minutes. It can also be easily transferred from one vehicle to another, or easily replaced if it malfunctions.

An in-vehicle wireless appliance can also collect data that is not accessible using a scan tool. For example, data that indicates a vehicles performance can be collected while the vehicle is actually driven. Scan tools, in contrast, can only collect data in a vehicle service bay. Service technicians, for example, can analyze DTCs during repair of the vehicle. The system described herein makes also makes data available in real-time, thereby allowing the technicians to order parts and schedule resources for service appointments before the vehicle is actually brought into the dealership.

The resulting data, of course, have many uses for automotive dealerships, vehicle-service organizations, vehicle-renting firms, insurance companies, vehicle owners, organizations that monitor emission performance (e.g., the EPA), manufacturers of vehicles and related parts, survey organizations (e.g., J.D. Power) and vehicle service centers. In general, these data yield information that benefits the consumer, vehicle and parts manufacturers, vehicle service centers, and the environment.

These and other advantages of the invention are described in the following detailed disclosure and in the claims.

BRIEF DESCRIPTION OF DRAWINGS

The features and advantages of the present invention can be understood by reference to the following detailed description taken with the drawings, in which:

FIG. 3 is a screen capture of a web page from the web site of FIG. 1 that shows a list of customers corresponding to a single dealership;

DESCRIPTION OF THE PREFERRED EMBODIMENTS

Figure 1:
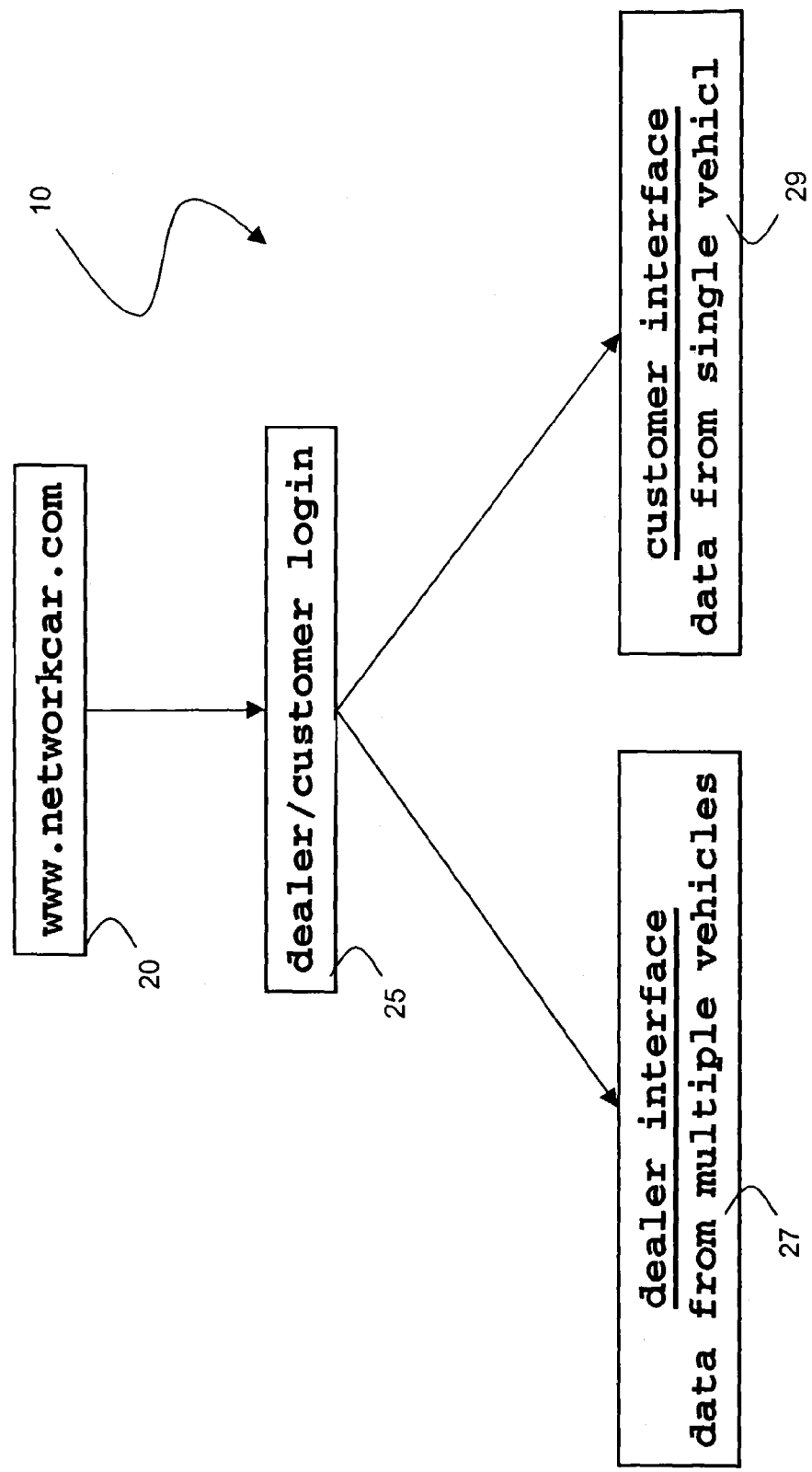
FIG. 1 is a schematic drawing of a website with a login process that renders a series of web pages associated with either a dealer interface or a customer interface.

FIG. 1 shows a schematic drawing of a login process 10 for a website 20 that displays diagnostic data for a series of 'customer' vehicles associated with a vehicle 'dealership'. Within each vehicle is a wireless appliance that retrieves data from the vehicle's engine computer, and then sends these data, formatted in a data packet, wirelessly through a network. The data eventually are transferred from the network to the website 20 where they are formatted and displayed and processed as described below.

A user 'logs' into the website 20 by entering a username and password that, once entered, are compared to a database associated with the website. The comparison determines if the user is a dealer or a customer. If the user is determined to be a dealer, the website renders a dealer interface 27 that contains, e.g., diagnostic information for each vehicle purchased from the particular dealership. Users viewing the dealer interface 27 do not have access to data corresponding to vehicles sold by other dealerships. If the user is determined to be a customer, the website 20 renders a customer interface 29 that contains diagnostic information for one or more vehicles corresponding to the customer. The customer interface contains diagnostic information for each vehicle corresponding to the customer.

Figure 2:
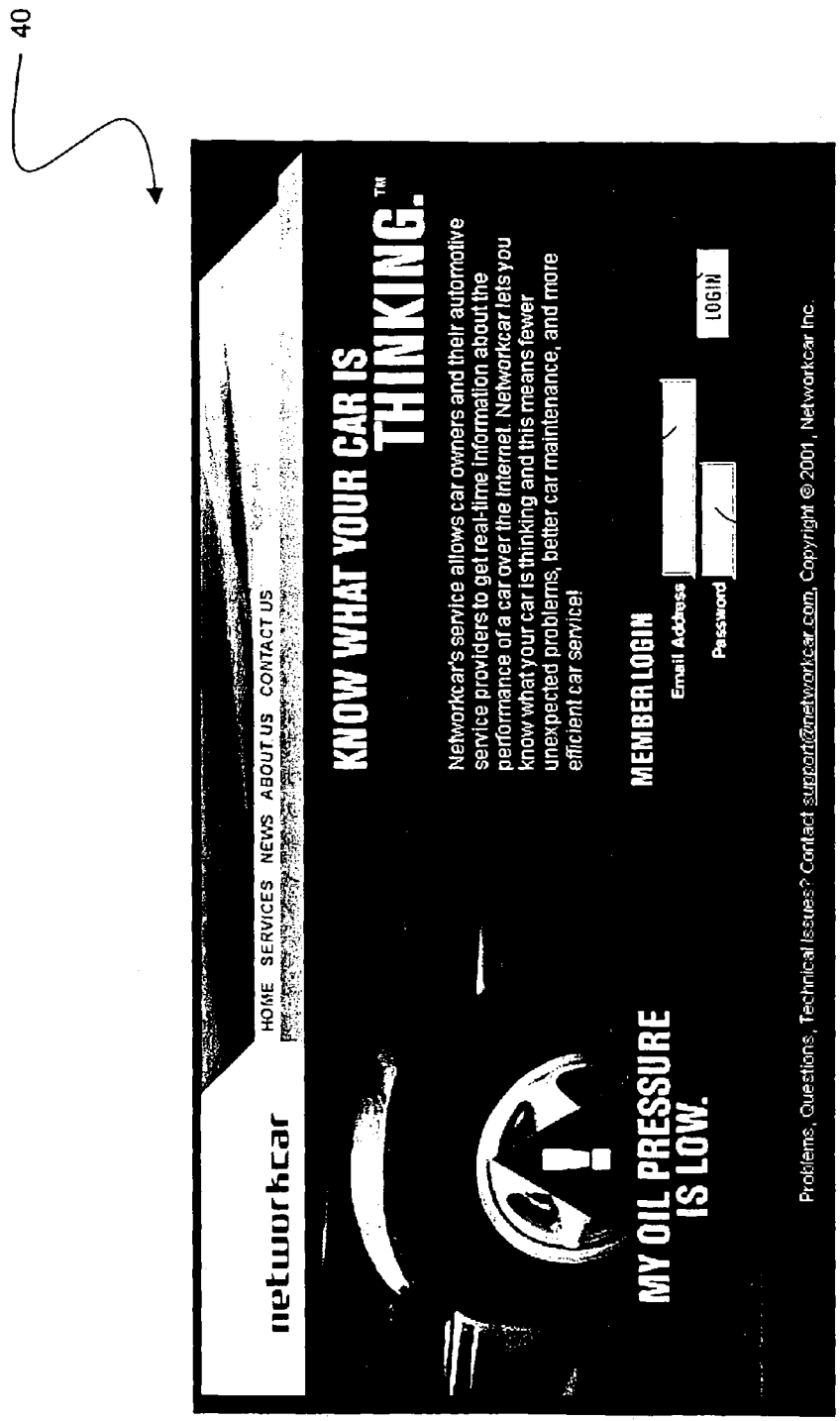
FIG. 2 is a screen capture of a web page from the web site of FIG. 1 wherein a user enters a login and password.

FIG. 2 shows a screen capture from a 'home' web page 40 of an actual website. The web page 40, corresponding to the web page 20 shown in FIG. 1 as www.networkcar.com, is accessed from a conventional web browser (e.g., Netscape Navigator). It renders a dealer/customer login portion 43 that prompts a user for a login and a password. The web page 40 includes a login region 42 where the user enters a login (in this case the user's email address), and a password region 44 where the user enters a corresponding password. The user then clicks the login button 46 to authenticate the login and log the user into the website as either a 'customer', 'dealer', or an invalid user. The authentication process is performed with conventional database software. Here and throughout the application, the term 'clicks' means a computer mouse is used to select or initiate a software-based feature on the web page.

The wireless appliance that provides a diagnostic data to the website is described in more detail in WIRELESS DIAGNOSTIC SYSTEM FOR VEHICLES, filed Feb. 1, 2001, the contents of which have been previously incorporated by reference. Each wireless appliance contains logic for retrieving data from the host vehicle and formatting the data in a data packet, and a wireless transmitter that transmits the data packet over an airlink to a wireless network (e.g., Cingular's 'Mobitex' network). Each appliance typically transmits a data packet at either a predetermined time interval (e.g., once each day), or shortly (e.g., within a few seconds) after a DTC is generated. The format of each data packet, along with the data contained therein, is described in the above-mentioned patent application. In general, each data packet contains information of its status, an address describing its destination, an address describing its origin, and a 'payload' that contains diagnostic data from the vehicle. The process for transmitting diagnostic data from a vehicle to a website is described in more detail in the above-referenced patent application.

FIG. 3 is a screen capture of a web page 50 included in the dealer interface indicated in FIG. 1. The host computer system renders this page once the user is determined to be a dealer following the login process. The screen capture features a customer list 52 corresponding to a single dealership that includes: customer names 56 for each customer; a vehicle description 58 that includes, the vehicle's year, make and model; a unique 17-digit vehicle identification number ('VIN') 60 that functions as the vehicle's serial number; and an 'alert' listing 62 that provides a number of alerts, described in more detail below, for each vehicle.

An alert is generated when data, sent from the vehicle's wireless appliance to the host computer system, indicates either 1) a mechanical/electrical problem with the vehicle; or 2) that a scheduled maintenance is recommended for the vehicle. For example, the customer list 52 includes a data field 54 that lists the user 'Five, Loaner' with an associated 2001 Toyota Corolla. The data field 54 also includes the number '1' in the alert listing 62, indicating the presence of one of a single alert.

Figure 4:
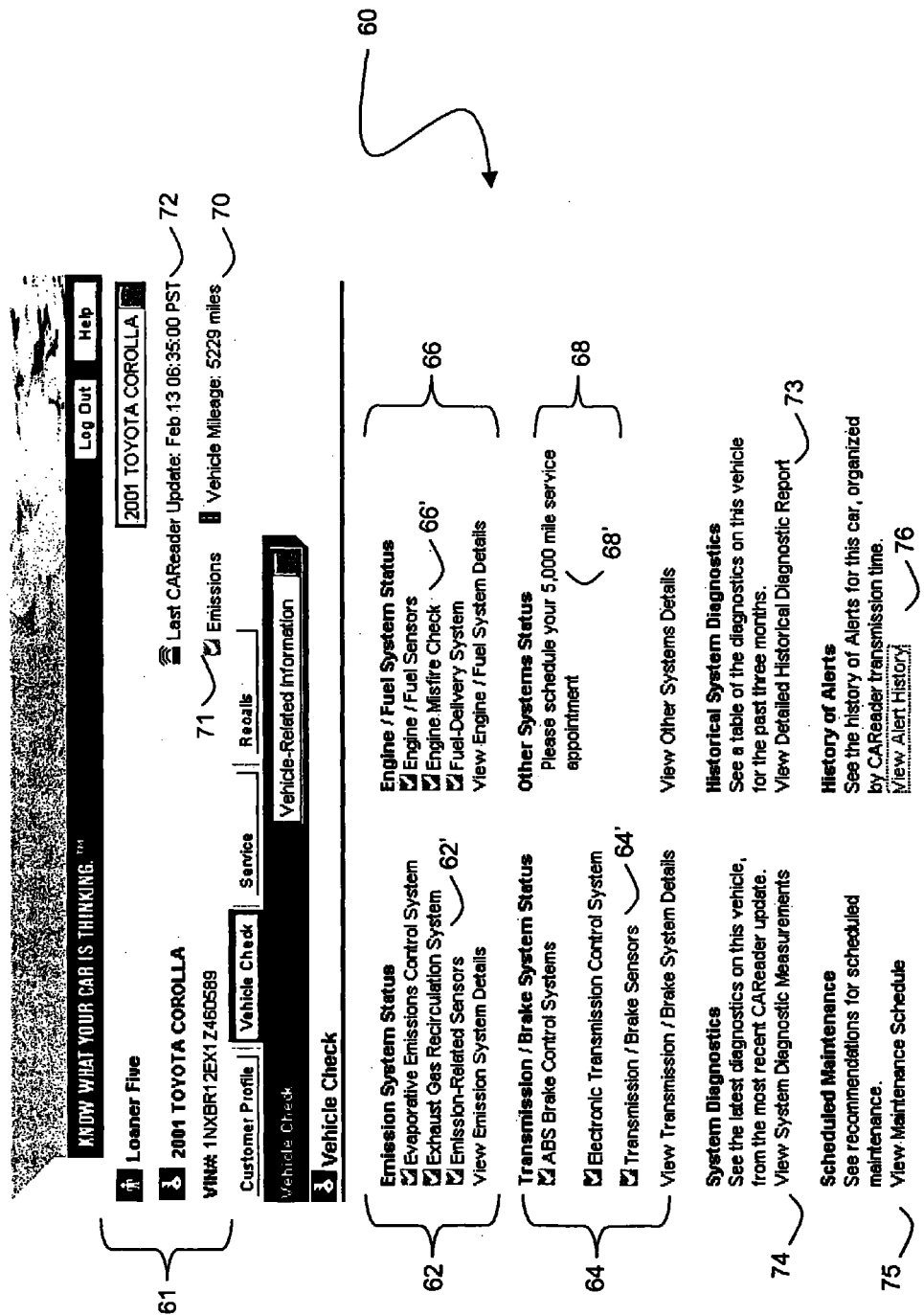
FIG. 4 is a screen capture of a web page from the web site of FIG. 1 that shows an alert message, generated by an odometer reading, for a customer's vehicle.

FIG. 4 is a screen capture of a web page 60 entitled a 'Vehicle Check Page' that describes in more detail the alert and other data for 'Five, Loaner'. The web page 60 for this user, or any other user in the customer list 52, is accessed by clicking on the highlighted name in the data field 54 shown in the web page 50 of FIG. 3. The web page 60 features a header 61 that lists general information corresponding to this particular user, e.g. name, vehicle description, and VIN. The header 61 also include diagnostic data such as a field 70 showing the vehicle's odometer reading (5229 miles), a time/date stamp 72 indicating the last time the host computer system received data from the vehicle, and an icon and data field 71 indicating the vehicle's emissions performance. In this last case, the green box with a 'checkmark' indicates that the vehicle's emissions are within the levels mandated by the EPA. It is present when the vehicle has no DTCs that are associated with its emissions system.

The web page 60 is separated into four categories describing, respectively, a status of the vehicle's 'emission' system 62, 'transmission/brakes' system 64, 'engine/fuel' system 66, and 'other' systems 68. For this vehicle, the emission 62, transmission/brakes 64, and engine/fuel 66 system categories have no associated alerts. This is indicated by, respectively, messages 62', 64', 66' preceded an icon that features a green box with a checkmark similar to that shown in the data field 71 describing the overview vehicle's emissions status. These icons indicate that no DTCs corresponding to the respective categories were detected. Conversely the 'other' system category 68 includes an alert message 68' that includes a text message field preceded by an icon that features a yellow box with a 'question mark'. The presence of this single alert message 68' is what generates the '1' listed in the data field 54 in FIG. 3. The alert message 68' is generated in response to an odometer reading (i.e., 5229 miles) transmitted in the most recent data packet sent by the vehicle.

The alert message 68' is first generated when the vehicle's mileage is within 1000 miles of the mileage corresponding to a recommended scheduled maintenance, which in this case is 5000 miles. Thus, an alert in generated and first appears on the web page 60 when the vehicle's odometer reading is 4000 miles or greater. Mileage values corresponding to this and other recommended schedule maintenances are entered into the system in a 'Scheduled Maintenance' section 75 on the same page. The alert message 68' appears on the web page 60 until: 1) the recommended service is performed on the vehicle; or 2) the vehicle's mileage is greater than 1000 miles from the mileage corresponding to a recommended scheduled maintenance (i.e., 6000 miles). In either case, the alert is 'cleared' from the web page 60 and is stored in a 'History of Alert' section 75 that, when clicked, historically lists all the cleared alerts corresponding to this particular vehicle.

Figures 5A, 5B:
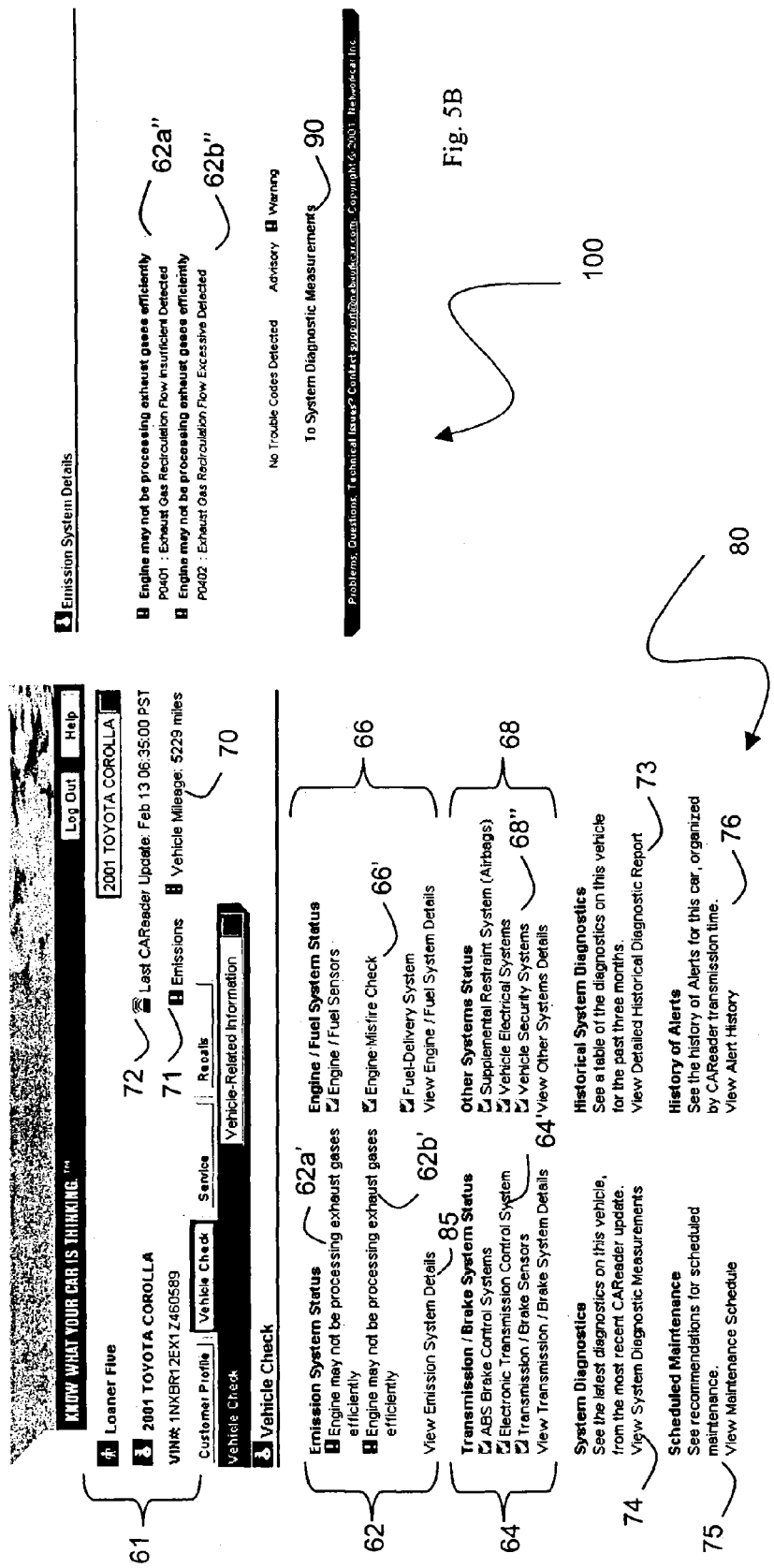
FIG. 5A is a screen capture of a web page from the web site of FIG. 1 that shows two alerts, each generated by a separate DTC, for a customer's vehicle.
FIG. 5B is a screen capture of a web page associated with the web page of FIG. 5A that shows two 5-digit DTCs corresponding to the two alert messages shown in FIG. 5A.

FIGS. 5A and 5B show, respectively, screen captures of web pages 80 and 100 that indicate alert messages 62a', 62b' triggered by the presence of separate emissions-related DTCs within the vehicle. The DTC is sent from the vehicle in the data packet described above. The web pages 80, 100 feature the same general format as shown for FIG. 4, i.e. four categories describing the vehicle's 'emission' system 62, 'transmission/brakes' system 64, 'engine/fuel' system 66, and 'other' systems 68. In this case, the transmission/brakes 64, engine/fuel 66 and other 68 systems have no associated alerts, and thus include messages 64', 66', and 68' preceded an icon that features a green box with a 'checkmark' as before. In contrast, the emissions system 62 includes two alert messages 62a', 62b'. Each message includes a brief text message: 'engine may not be processing exhaust gasses efficiently'. The text message is included in a database and associated with each of the 5-digit DTCs. Note that the presence of the alert messages 62a', 62b' means that there is a problem with this vehicle's emission system, and thus the icon in the data field 71 in the page's header 61 is red with an exclamation point.

Figure 6:
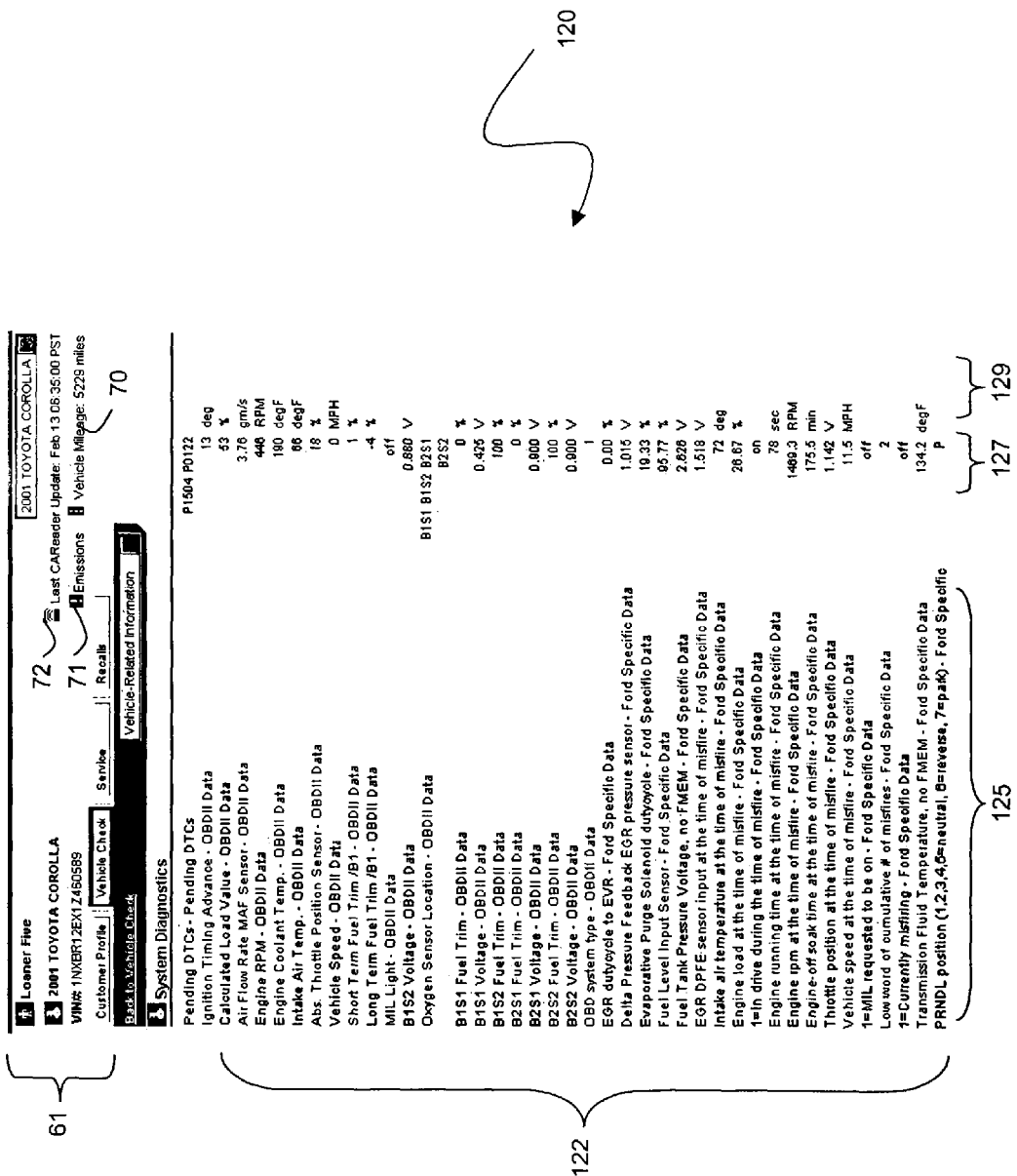
FIG. 6 is a screen capture of a web page from the web site of FIG. 1 that shows recent diagnostic data for a customer's vehicle.

FIG. 5B shows a screen capture of a web page 100 that includes more details for the alert messages 62a, 62b' from FIG. 5A. The web page 100 renders when a user clicks on the 'View Emissions System Details' link 85 in the emissions category 62 and includes alert messages 62a", 62b". These messages are essentially more detailed versions of the alert messages 62a', 62b' shown in FIG. 5A. They include the same text description as alert messages 62a', 62b' in addition to a more detailed text description ("Exhaust Gas. Recirculation Flow Insufficient Detected' for alert message 62a"; "Exhaust Gas Recirculation Flow Excessive Detected' for alert message 62b"") and the 5-digit DTC (P0401 for alert message 62a"; P0402 for alert message 62b"). Detailed diagnostic data corresponding to the DTCs is accessed by clicking on the 'To System Diagnostic Measurements' field 90 in FIG. 5B. As shown in FIG. 6, this field 90 renders a web page 120 that lists a detailed data set 122 transmitted from the vehicle-based wireless appliance to the host computer system. The host computer system receives the data set 122 at a time described by a time/date stamp 72 listed in the header 61. The data set 122 includes a data parameter name 125, corresponding numerical value 127, and a description of the units 129 of the numerical value 127. Some of the numerical values (e.g., the status of the 'MIL light' 131) are dimensionless, i.e. they do not have units. As described above, to generate the numerical values 127 the wireless appliance queries the vehicle's ECU at a set time interval (e.g. every 20 seconds), and transmits a data set 122 at a longer time interval (e.g. every 10 minutes). Thus, the numerical, values in the data set can represent 'instantaneous' values that result from a single query to the ECU, or they can represent 'average' values that result from an average from multiple sequential queries.

The data parameters within the set 122 describe a variety of electrical, mechanical, and emissions-related functions in the vehicle. Several of the more significant parameters from the set are listed in Table 1, below:

TABLE 1

Parameters Monitored from Vehicle

Pending DTCs
Ignition Timing Advance
Calculated Load Value
Air Flow Rate MAF Sensor
Engine RPM
Engine Coolant Temperature
Intake Air Temperature
Absolute Throttle Position Sensor
Vehicle Speed
Short-Term Fuel Trim
Long-Term Fuel Trim
MIL Light Status
Oxygen Sensor Voltage
Oxygen Sensor Location
Delta Pressure Feedback EGR Pressure Sensor
Evaporative Purge Solenoid Dutycycle
Fuel Level Input Sensor
Fuel Tank Pressure Voltage
Engine Load at the Time of Misfire
Engine RPM at the Time of Misfire
Throttle Position at the Time of Misfire
Vehicle Speed at the Time of Misfire
Number of Misfires
Transmission Fluid Temperature
PRNDL position (1,2,3,4,5 = neutral, 6 = reverse)
Number of Completed OBDII Trips
Battery Voltage The parameters listed in Table 1 were measured from a Ford Crown Victoria. Similar sets of data are available for nearly all vehicles manufactured after 1996. In addition to these, hundreds of other vehicle-specific parameters are also available from the vehicle's ECU.

The data set 122 shown in FIG. 6 represents a current data sent from the vehicle's wireless appliance to the host computer system. Data sets sent at earlier times can also be analyzed individually or in a group to determine the vehicle's performance. These 'historical data', for example, can by used to determine trends in the vehicle's performance. In some cases data analyzed in this manner can be used to predict potential problems with the vehicle before they actually occur.

Figure 7:
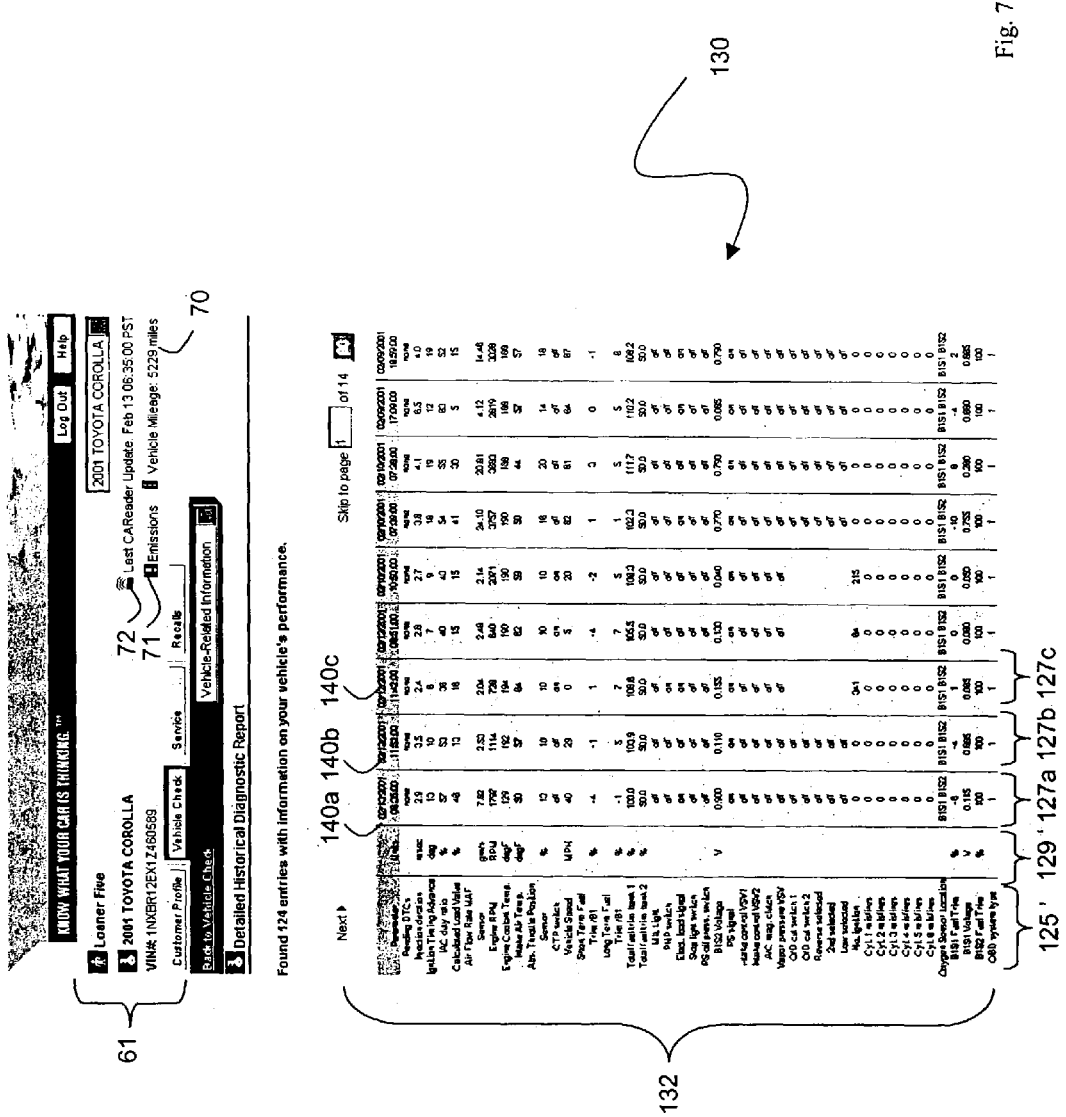
FIG. 7 is a screen capture of a web page from the website of FIG. 1 that shows several time-dependent sets of diagnostic data for a customer's vehicle.

Referring to FIG. 7, a web page 130 includes a historical data set 132 containing data parameter names 125', units 129' and a series of data sets 127a-127c transmitted at earlier times from the in-vehicle wireless appliance. Each of these data sets is similar to the data set 122 shown in FIG. 6, but is received by the host computer system at an earlier time indicated by a timestamps 140a-140c. For example, the first two data sets 127c, 127b where transmitted with time stamps 140b, 140c of 11:42 and 11:52 on Feb. 12, 2001; the last data set 127a was transmitted the next morning with a time stamp 140a of 6:05. Time-dependent data shown in this manner can be analyzed to determine trends in a vehicle's performance. The trends can then be used to diagnose or predict a problem with the vehicle.

Other embodiments are also within the scope of the invention. In particular, the web pages used to display the data can take many different forms, as can the manner in which the data are displayed. Web pages are typically written in a computer language such as 'HTML' (hypertext mark-up language), and may also contain computer code written in languages such as java for performing certain functions (e.g., sorting of names). The web pages are also associated with database software (provided by companies such as Oracle) that is used to store and access data. Equivalent versions of these computer languages and software can also be used.

Different web pages may be designed and accessed depending on the end-user. As described above, individual users have access to web pages that only show data for their particular vehicle, while organizations that support a large number of vehicles (e.g. dealerships or distributors) have access to web pages that contain data from a collection of vehicles. These data, for example, can be sorted and analyzed depending on vehicle make, model, odometer reading, and geographic location. The graphical content and functionality of the web pages may vary substantially from what shown in the above-described figures. In addition, web pages may also be formatted using standard wireless access protocols (WAP) so that they can be accessed using wireless devices such as cellular telephones, personal digital assistants (PDAs), and related devices.

The web pages also support a wide range of algorithms that can be used to analyze data once it is extracted from the data packets. For example, the above-mentioned method alert messages are sent out in response to a DTC or when a vehicle approaches a pre-specified odometer reading. Alternatively, the message could be sent out when a data parameter (e.g. engine coolant temperature) exceeded a predetermined value. In some case, multiple parameters (e.g., engine speed and load) can be analyzed to generate an alert message. In general, an alert message can be sent out after analyzing one or more data parameters using any type of algorithm. These algorithms range from the relatively simple (e.g., determining mileage values for each vehicle in a fleet) to the complex (e.g., predictive engine diagnoses using 'data mining' techniques). Data analysis may be used to characterize an individual vehicle as described above, or a collection of vehicles, and can be used with a single data set or a collection of historical data. Algorithms used to characterize a collection of vehicles can be used, for example, for remote vehicle or parts surveys, to characterize emission performance in specific geographic locations, or to characterize traffic.

Other embodiments of the invention include algorithms for analyzing data to characterize vehicle accidents and driving patterns for insurance purposes; algorithms for determining driving patterns for use-based leasing; and algorithms for recording vehicle use and driving patterns for tax purposes. In general, any algorithm that processes data collected with the above-described method is within the scope of the invention.

Similarly, the temporal or mileage frequency at which data is collected can be adjusted to diagnose specific types of problems. For example, characterization of certain types of vehicle performance indicators, such as emissions, may need to be monitored relatively frequently (e.g., once every few minutes). Other properties, such as mileage and fluid levels, may only need to be monitored every few days, or in some cases just a few times each year.

In other embodiments; additional hardware can be added to the in-vehicle wireless appliance to increase the number of parameters in the transmitted data. For example, hardware for global-positioning systems (GPS) may be added so that the location of the vehicle can be monitored along with its data. Or the radio modem used to transmit the data may employ a terrestrial GPS system, such as that available on modems designed by Qualcomm, Inc. In still other embodiments, the location of the base station that transmits the message can be analyzed to determine the vehicle's approximate location. In addition, the wireless appliance may be interfaced to other sensors deployed in the vehicle to monitor additional data. For example, sensors for measuring tire pressure and temperature may be deployed in the vehicle and interfaced to the appliance so that data relating the tires' performance can be transmitted to the host computer system.

In other embodiments, data processed using the above-described systems can be used for: remote billing/payment of tolls; remote smog and emissions checks; remote payment of parking/valet services; remote control of the vehicle (e.g., in response to theft or traffic/registration violations); and general survey information.

Still other embodiments are within the scope of the following claims.

What is claimed is:

1. A method for monitoring a vehicle, comprising:
   (a) wirelessly receiving data, by a computer system and from a vehicle, the data comprising numerical diagnostic or location-based data associated with the vehicle;
   (b) processing the data with the computer system according to a mathematical algorithm to generate diagnostic or location information that is at least in part derived from the received data, and wherein the derived information has a meaning distinct from the received data;
   (c) displaying the derived diagnostic or location information on at least one website, the website having a web interface for presenting information associated with the vehicle, wherein the interface includes at least one of an icon and a data field associated with derived information indicative of emissions performance of the vehicle; and
   (d) transmitting an electronic communication including information associated with the derived diagnostic or location information,
      wherein the vehicle is selected from a group consisting of an automobile, truck, wheeled commercial equipment, heavy truck, power sport vehicle, collision repair vehicle, marine vehicle, and recreational vehicle.

2. The method of claim 1, wherein the received data contains information representative of one or more vehicle parameters and wherein the processing further includes processing at least one of the vehicle parameters with a database application.

3. The method of claim 2, wherein the processing further includes extracting information representative of at least one of the following vehicle parameters from the received data: numerical data, an alphanumeric text message, an active or pending diagnostic trouble code, and a vehicle identification number.

4. The method of claim 1, wherein the communication describes an active or pending diagnostic trouble code.

5. The method of claim 4, wherein the communication comprises a 5, 6, or 7 digit code that describes the active or pending diagnostic trouble code.

6. The method of claim 1, wherein the numerical diagnostic data associated with the vehicle comprises at least one of numerical data generated by a sensor in the vehicle, and numerical data generated by a computer within the vehicle.

7. The method of claim 6, wherein the numerical diagnostic data includes at least one of the following numerical parameters: diagnostic trouble codes, vehicle speed, fuel level, fuel pressure, miles per gallon, engine RPM, mileage, oil pressure, oil temperature, tire pressure, tire temperature, engine coolant temperature, intake-manifold pressure, engine performance tuning parameters, alarm status, accelerometer status, cruise-control status, fuel injector performance, spark-plug timing, and a status of an anti-lock braking system.

8. The method of claim 7, wherein the processing further comprises processing at least one numerical parameter from the numerical data with a mathematical algorithm.

9. The method of claim 8, wherein the processing further comprises comparing at least one numerical parameter with at least one numerical parameter generated at an earlier point in time.

10. The method of claim 9, wherein the displaying further comprises displaying at least one numerical parameter and at least one numerical parameter generated at an earlier point in time.

11. The method of claim 8, wherein the processing further comprises comparing at least one numerical parameter with at least one predetermined numerical value.

12. The method of claim 11, wherein the displaying further comprises displaying at least one numerical parameter and at least one predetermined numerical value.

13. The method of claim 11, wherein the at least one predetermined numerical value comprises a mileage value.

14. The method of claim 1, wherein the communication comprises an alert.

15. The method of claim 14, wherein the alert is associated with a problem in the vehicle or a predetermined maintenance event for the vehicle.

16. The method of claim 1, wherein the vehicle is at a location remote from the computer system.

17. The method of claim 1, further comprising updating software of the at least one website.

18. The method of claim 1, wherein the website includes at least username and password input fields.

19. The method of claim 1, wherein the communication describes the vehicle's location.

20. The method of claim 1, wherein the at least one of the icon or data field are displayed in a predetermined color to indicate whether an output of the algorithm satisfies emission criteria that the vehicle's emission equipment is not malfunctioning and that a user of the vehicle has driven in a manner that reduces emission.

21. The method of claim 1 further comprising the website having a login web page, wherein entering a login associated with a first group of users causes the website to display a first web interface dedicated to presenting information associated with a single vehicle, and wherein entering a login associated with one of a second group of users causes the website to display a second web interface presenting information associated with a group of vehicles including the single vehicle.

22. The method of claim 21, wherein the second web interface is an interface for at least one organization selected from a group consisting of a dealership, a service entity, an insurance entity, a performance monitoring entity, and a survey entity.

23. A method for monitoring a set of vehicles, comprising:
   (a) wirelessly receiving, by a computer system and from a first vehicle and a second vehicle among a set of vehicles, first and second data packets comprising numerical diagnostic or location-based data associated respectively with the first and second vehicles;
(b) processing the respective data packets with the computer system according to a mathematical algorithm to generate, for each of the first and second vehicles, diagnostic or location information that is at least in part derived from the received data packets, and wherein the derived information has a meaning distinct from the received data packets;
(c) upon entry of a login associated with a first user, displaying the derived diagnostic or location information for the first vehicle only on a first web interface of a website, wherein the first interface includes at least one of an icon and data field associated with derived information indicative of emissions performance of the first vehicle;
(d) upon entry of a login associated with a second user, displaying the derived diagnostic or location information for the first and second vehicles on a second web interface of the website, wherein the second interface includes at least one of an icon and a data field associated with derived information indicative of the emissions performance of, and corresponding to, each vehicle, the second web interface being different from the first web interface; and
(e) transmitting an electronic communication including information associated with the derived diagnostic or location information,
wherein the first web interface is a customer interface directly accessible by a customer,
wherein the second web interface is an interface for at least one organization selected from a group consisting of a dealership, a service entity, an insurance entity, a performance monitoring entity, and a survey entity, and
wherein the vehicles are selected from a group consisting of an automobile, truck, wheeled commercial equipment, heavy truck, power sport vehicle, collision repair vehicle, marine vehicle, and recreational vehicle.

24. The method of claim 23, wherein the processing further includes extracting at least one of the following vehicle parameters from the first and second data packets: numerical data, an alphanumeric text message, an active or pending diagnostic trouble code, a vehicle identification number.

25. The method of claim 24, wherein the processing further includes processing at least one of the vehicle parameters with a database application.

26. The method of claim 23, wherein the website comprises a login web page including username and password input fields.

27. The method of claim 23, wherein the icons and data fields are displayed in a predetermined color to indicate whether an output of the algorithm corresponding to a given vehicle satisfies emission criteria that the vehicle's emission equipment is not malfunctioning and that a user of the corresponding vehicle has driven in a manner that reduces emission.

28. A method for monitoring a vehicle, comprising:
(a) wirelessly receiving, by a computer system and from a vehicle, data descriptive of the vehicle's location;
(b) processing the received data with the computer system according to a mathematical algorithm to generate location information that is at least in part derived from the received data, and wherein the derived information has a meaning distinct from the received data; and
(c) displaying the generated location information on a website, the website implementing a first web interface having a first login and dedicated to presenting information about a single vehicle, and a second web interface having a second login and presenting information about a group of vehicles including the vehicle, wherein at least one of an icon and a data field of the first web interface and at least one of an icon and a data field of the second web interface are associated with derived information indicative of, respectively, the single vehicle's or the group of vehicles' emissions performance,
wherein the first web interface is a customer interface directly accessible by a customer,
wherein the second web interface is an interface for at least one organization selected from a group consisting of a dealership, a service entity, an insurance entity, a performance monitoring entity, and a survey entity, and
wherein the vehicle is selected from a group consisting of an automobile, truck, wheeled commercial equipment, heavy truck, power sport vehicle, collision repair vehicle, marine vehicle, and recreational vehicle.

29. The method of claim 28, wherein the icons and data fields indicate that the vehicle's, or the vehicles', emission equipment is not malfunctioning and that a user, or users, of the corresponding vehicle, or vehicles, have driven in a manner that reduces emission.

30. A programmed apparatus, programmed to execute a method comprising:
(a) wirelessly receiving data, by a computer system and from a vehicle, the data comprising numerical diagnostic or location-based data associated with the vehicle;
(b) processing the data with the computer system according to a mathematical algorithm to generate diagnostic or location information that is at least in part derived from the received data, and wherein the derived information has a meaning distinct from the received data;
(c) displaying the derived diagnostic or location information on at least one website, the website having a web interface for presenting information associated with the vehicle, wherein the interface includes at least one of an icon and data field associated with derived information indicative of emissions performance of the vehicle; and
(d) transmitting an electronic communication including information associated with the derived diagnostic or location information, and
wherein the vehicle is selected from a group consisting of an automobile, truck, wheeled commercial equipment, heavy truck, power sport vehicle, collision repair vehicle, marine vehicle, and recreational vehicle.

31. The programmed apparatus of claim 30, wherein the received data contains one or more vehicle parameters and wherein the processing further includes processing at least one of the vehicle parameters with a database application.

32. The programmed apparatus of claim 31, wherein the processing further includes extracting at least one of the following vehicle parameters from the received data: numerical data, an alphanumeric text message, an active or pending diagnostic trouble code, and a vehicle identification number.

33. The programmed apparatus of claim 30, wherein the communication describes an active or pending diagnostic trouble code.

34. The programmed apparatus of claim 33, wherein the communication comprises a 5, 6, or 7 digit code that describes the active or pending diagnostic trouble code.

35. The programmed apparatus of claim 30, wherein the numerical diagnostic data associated with the vehicle comprises at least one of numerical data generated by a sensor in the vehicle, and numerical data generated by a computer within the vehicle.

36. The programmed apparatus of claim 35, wherein the numerical diagnostic data includes at least one of the following numerical parameters: diagnostic trouble codes, vehicle speed, fuel level, fuel pressure, miles per gallon, engine RPM, mileage, oil pressure, oil temperature, tire pressure, tire temperature, engine coolant temperature, intake-manifold pressure, engine performance tuning parameters, alarm status, accelerometer status, cruise-control status, fuel injector performance, spark-plug timing, and a status of an anti-lock braking system.

37. The programmed apparatus of claim 36, wherein the processing further comprises processing at least one numerical parameter from the numerical data with a mathematical algorithm.

38. The programmed apparatus of claim 37, wherein the processing further comprises comparing at least one numerical parameter with at least one numerical parameter generated at an earlier point in time.

39. The programmed apparatus of claim 38, wherein the displaying further comprises displaying at least one numerical parameter and at least one numerical parameter generated at an earlier point in time.

40. The programmed apparatus of claim 37, wherein the processing further comprises comparing at least one numerical parameter with at least one predetermined numerical value.

41. The programmed apparatus of claim 40, wherein the at least one predetermined numerical value comprises a mileage value.

42. The programmed apparatus of claim 30, wherein the communication comprises an alert.

43. The programmed apparatus of claim 42, wherein the alert is associated with a problem in the vehicle or a predetermined maintenance event for the vehicle.

44. The programmed apparatus of claim 30, wherein the vehicle is at a location remote from the computer system.

45. The programmed apparatus of claim 30, wherein the website comprises at least username and password input fields.

46. The programmed apparatus of claim 30, wherein the communication describes the vehicle's location.

47. The programmed apparatus of claim 30, wherein the at least one of an icon or data field are displayed in a predetermined color to indicate whether the algorithm's output satisfies emission criteria that the vehicle's emission equipment is not malfunctioning and that a user of the vehicle has driven in a manner that reduces emission.

48. The apparatus of claim 30, further comprising the website having a login web page, wherein entering a login associated with a first group of users causes the website to display a first web interface dedicated to presenting information associated with a single vehicle, and wherein entering a login associated with one of a second group of users causes the website to display a second web interface presenting information associated with a group of vehicles including the single vehicle.

49. The method of claim 48, wherein the second group of users comprises at least one organization selected from a group consisting of a dealership, a service entity, an insurance entity, a performance monitoring entity, and a survey entity.

50. A machine-readable medium encoded with a plurality of processor-executable instructions for:
   (a) wirelessly receiving data, by a computer system and from a vehicle, the data comprising numerical diagnostic or location-based data associated with the vehicle;
   (b) processing the data with the computer system according to a mathematical algorithm to generate diagnostic or location information that is at least in part derived from the received data, and wherein the derived information has a meaning distinct from the received data;
   (c) displaying the derived diagnostic or location information on at least one website, the website having a web interface for presenting information associated with the vehicle, wherein the interface includes at least one of an icon and data field associated with derived information indicative of the vehicle's emissions performance of the vehicle; and
   (d) transmitting an electronic communication including information associated with the derived diagnostic or location information, and
   wherein the vehicle is selected from a group consisting of an automobile, truck, wheeled commercial equipment, heavy truck, power sport vehicle, collision repair vehicle, marine vehicle, and recreational vehicle.

51. The machine-readable medium of claim 50, wherein the received data contains one or more vehicle parameters and wherein the processing further includes extracting at least one of the following vehicle parameters from the received data: numerical data, an alphanumeric text message, an active or pending diagnostic trouble code, and a vehicle identification number.

52. The machine-readable medium of claim 50, wherein the communication describes an active or pending diagnostic trouble code.

53. The machine-readable medium of claim 50, wherein the numerical diagnostic data associated with the vehicle comprises at least one of numerical data generated by a sensor in the vehicle, and numerical data generated by a computer within the vehicle.

54. The machine-readable medium of claim 53, wherein the numerical diagnostic data includes at least one of the following numerical parameters: diagnostic trouble codes, vehicle speed, fuel level, fuel pressure, miles per gallon, engine RPM, mileage, oil pressure, oil temperature, tire pressure, tire temperature, engine coolant temperature, intake-manifold pressure, engine performance tuning parameters, alarm status, accelerometer status, cruise-control status, fuel injector performance, spark-plug timing, and a status of an anti-lock braking system.

55. The machine-readable medium of claim 54, wherein the processing further comprises processing at least one numerical parameter from the numerical data with a mathematical algorithm.

56. The machine-readable medium of claim 55, wherein the processing further comprises comparing at least one numerical parameter with at least one numerical parameter generated at an earlier point in time.

57. The machine-readable medium of claim 50, wherein the communication comprises an alert.

58. The machine-readable medium of claim 50, wherein the at least one of the icon or data field are displayed in a predetermined color to indicate whether the algorithm's output satisfies emission criteria that the vehicle's emission equipment is not malfunctioning and that a user of the vehicle has driven in a manner that reduces emission.

59. A graphical user interface for displaying processed information for a set of vehicles, comprising:
   a viewing device displaying a graphical user interface including:
     (a) a first interface displaying information associated with a set of vehicles and viewable by at least one organization; and
     (b) a second interface displaying information associated with a single vehicle among the set of vehicles;

wherein the information displayed by the first interface and the second interface is includes diagnostic or location information, at least in part derived from data wirelessly received by a computer system from one or more vehicles and processed according to a mathematical algorithm, and wherein the derived information has a meaning distinct from the received data, wherein the first interface is an interface that includes at least one of an icon and data field associated with derived information indicative of emissions performance of the set of vehicle for the at least one organization selected from a group consisting of a dealership, a service entity, an insurance entity, a performance monitoring entity, and a survey entity, and wherein the set of vehicles is selected from a group consisting of an automobile, truck, wheeled commercial equipment, heavy truck, power sport vehicle, collision repair vehicle, marine vehicle, and recreational vehicle.

60. The graphical user interface of claim 59, wherein the displayed graphical user interface further comprises at least username and password input fields.

61. The graphical user interface of claim 59, wherein the information displayed by the first interface and the second interface comprises historical status information.

62. The graphical user interface of claim 59, wherein the displayed graphical user interface includes a web browser.

63. The graphical user interface of claim 59, wherein the displayed graphical user interface is formatted using at least one wireless access protocol (WAP).

64. The graphical user interface of claim 59, wherein the viewing device is one of a cellular telephone, a personal digital assistant (PDA), or a computer.

65. The graphical user interface of claim 59, wherein the at least one of the icon or data field are displayed in a predetermined color to indicate whether the algorithm's output satisfies emission criteria that the vehicle's emission equipment is not malfunctioning and that a user of the vehicle has driven in a manner that reduces emission.

\* \* \* \* \*